United States Patent [19]

Hencz

[11] Patent Number: 4,939,807
[45] Date of Patent: Jul. 10, 1990

[54] SNOW REMOVAL DEVICE

[76] Inventor: Edward T. Hencz, 812 10th St., Fargo, N. Dak. 58103

[21] Appl. No.: 278,582

[22] Filed: Dec. 1, 1988

[51] Int. Cl.⁵ .............................................. A47L 1/06
[52] U.S. Cl. ..................................... 15/111; 15/105; 15/114; 15/117; 15/160
[58] Field of Search ................. 15/117, 105, 111, 114, 15/160, 236.07

[56] References Cited

U.S. PATENT DOCUMENTS

| | | |
|---|---|---|
| D. 222,025 | 9/1971 | Whitaker . |
| D. 258,779 | 4/1981 | Nopkins et al. . |
| D. 269,054 | 5/1983 | Bauer . |
| 1,234,452 | 7/1917 | Enders ............................... 15/111 X |
| 2,277,528 | 3/1942 | Osborn .............................. 15/105 X |
| 2,856,621 | 10/1958 | Racicot . |
| 2,867,827 | 1/1959 | Gantz . |
| 2,900,656 | 8/1959 | Tupper .............................. 15/105 X |
| 3,051,975 | 9/1982 | Schwartz ............................ 15/105 |
| 4,197,017 | 4/1980 | Whelan ......................... 15/236.07 X |
| 4,293,975 | 10/1981 | Ainsworth ........................ 15/105 X |
| 4,302,862 | 12/1981 | Machacek et al. . |
| 4,674,186 | 6/1987 | Galiano ......................... 15/236.07 X |

OTHER PUBLICATIONS

Photographs A-E-Commercially available devices.

Primary Examiner—Frankie L. Stinson
Attorney, Agent, or Firm—Merchant, Gould, Smith, Edell, Welter & Schmidt

[57] ABSTRACT

A snow removal device for removing snow from a vehicle is provided. The snow removal device includes a brushing portion and a plowing portion, generally disposed at one end of an elongated handle and extending generally parallel thereto. The plowing means facilitates the removal of relatively heavy snow, while the brushing means facilitates removal of relatively light snow.

19 Claims, 2 Drawing Sheets

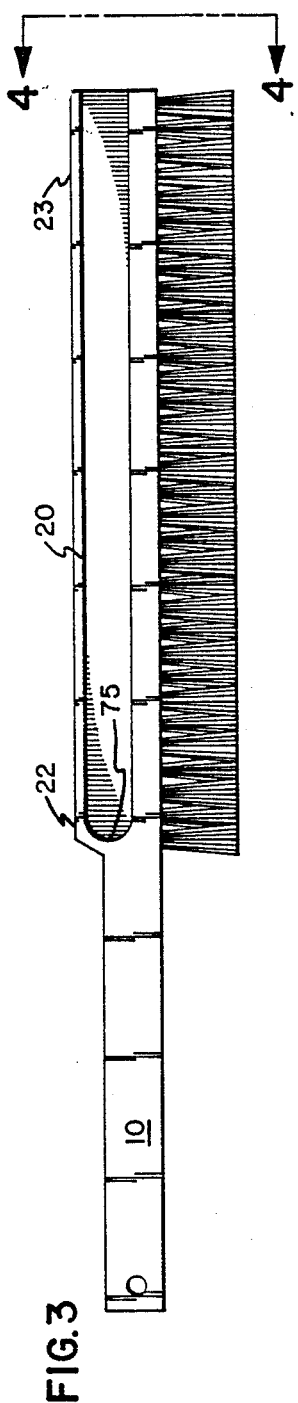
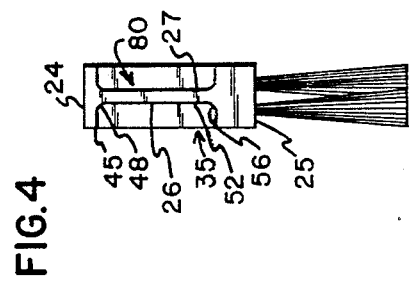
FIG.3
FIG.4

SNOW REMOVAL DEVICE

FIELD OF THE INVENTION

This invention relates generally to snow removal devices. In particular, it pertains to hand-held devices for use to remove snow from a vehicle windshield and/or windows.

BACKGROUND OF THE INVENTION

A variety of devices are known for removing snow and ice from surfaces. Two major categories are: those designed for use to remove snow and ice from sidewalks or driveways, and those used for removing snow and ice from surfaces, for example windshields, of motor vehicles.

Snow removal devices designed for use on a vehicle include: tools for brushing relatively light snow, and tools for scraping ice from glass. A variety of arrangements for scraper tools, brushing tools, and combinations of brushing and scraping tools are known. For instance, a typical snow removal device includes a brushing tool disposed at one end of an elongated handle portion, and a plastic scraper tool at the opposite end of the elongated handle portion.

Known arrangements for scraper tools, brushing tools, and combinations thereof typically do not, however, provide a means for removing heavy or relatively deep snow. Brushing tools provided on snow removal devices are generally efficient to brush away a light dusting of snow but are less efficient to remove heavy snow, since snow typically tends to pass between the bristles, bend the bristles, or pass over the top of the device, such that displaced snow lands in the wake of the device. Ice-scraping tools are typically not large enough to efficiently remove heavy snow; a relatively large number of passes with a scraping tool are required to clear a windshield or the like.

Devices are known for removing heavy snow from sidewalks, driveways and the like. Some of the these devices, such as that shown in Gantz, U.S. Pat. No. 2,867,827, further provide a brushing means to remove a light dusting of snow after heavy snow is removed with the shovel portion.

It is, however, awkward to use a shovel or the like, as intended for use on a sidewalk or driveway, to remove heavy snow from a vehicle. Since the snow removal portion of a shovel is typically perpendicular to the handle portion, the mass moment of the shovel is such that the shovel tends to rotate about the longitudinal axis of the handle unless the shovel portion rests firmly on a surface to be cleared. Further, sidewalk shovels are typically large and relatively heavy; therefore it is difficult to lift a shovel to vehicle window level. Since shovels are typically of metal and typically include sharp edges and corners, use of such a device on a vehicle may easily result in damage to the vehicle. Also, shovels are large and not readily stored under a seat of a vehicle, a convenient storage place for a windshield scraper.

What is needed is a device for use to relatively efficiently remove heavy snow, as well as light snow, from a vehicle. It is particularly convenient to include more than one snow removal tool on a snow removal device so that a user is more apt to do a thorough job of removing snow and ice to make the vehicle safe for driving. If the user must hunt for all appropriate tools to remove view-obstructing snow, he or she is particularly apt to use an inadequate tool and, therefore, do an inadequate job of removing the snow.

SUMMARY OF THE INVENTION

The present invention provides means for conveniently removing relatively heavy snow from a vehicle windshield or windows, and a means for brushing light snow from the same. Generally, the device includes a brushing means disposed opposite a plowing means on a body member with a handle extending therefrom.

More specifically, a snow removal device according to this invention includes a handle or gripping portion and a snow removal portion disposed at opposite ends of the device.

In the preferred embodiment, the snow removal portion includes an elongate, substantially flat body or spine member having first and second end portions.

The preferred body member includes a first, top face portion and a second, bottom face portion. It is to be understood that the terms "top", "bottom", "upper", and "lower", as used throughout, are meant only for convenience in referring to the drawings. The terms should not be considered otherwise limiting. The top and bottom face portions are generally parallel and spaced apart. The body member further includes first and second side face portions, generally perpendicular to and contiguous with the top and bottom face portions.

The preferred snow removal portion includes a brushing or sweeping means extending from the bottom face portion. The brushing means is generally elongate and generally longitudinally parallel to the body member. The brushing means preferably includes a plurality of bristles attached to the body member in any suitable manner, such as gluing.

The preferred snow removal portion further includes at least one plowing means. The preferred plowing means has first and second opposite end portions and includes a generally concave plowing member or body which may have a generally curved shape or a generally angular shape; that is, the concave plowing member may be a curved surface or it may be a series of planar and curved surfaces intersecting at angles which will be described below. The concave plowing member defines a channel or trough which is substantially parallel to the body member.

The preferred concave plowing member includes a series of edges, and curved and planar surfaces. A first edge portion is proximate the top face portion of the body member. A plowing member upper curved portion generally defines the top of the channel portion and is adjacent the first edge portion. The preferred plowing member upper curved portion is tapered toward the body member upper face portion, such that the plowing member edge portion is generally coplanar with the upper face portion.

The preferred concave plowing member further includes a central, substantially vertical wall portion immediately adjacent the upper curved portion. A lower sloping wall portion adjacent the vertical wall portion completes the plowing member. Preferably, an angle greater than 90° is defined between the vertical wall portion and the sloping wall portion; particularly, an angle between 110° and 160° is desirable.

The preferred plowing means includes a guarding or snow-stopping portion proximate the plowing means first end portion. The guarding portion closes the first end portion of the channel portion; that is, the channel portion is closed at the end nearer the handle, and open at the opposite end.

The preferred embodiment of the device includes a second plowing means, similar to the first plowing means, in back-to-back parallel relationship with the first plowing means.

In the preferred embodiment the handle portion is elongate and substantially flat. It extends from the first end portion of the snow removal body member, generally parallel to the body member. The preferred handle portion and body member are integral; that is, they are formed of a continuous, elongate, substantially flat member.

As stated, the plowing means and the brushing means are generally parallel to the body member and handle portion. Thus, in use, the handle portion typically extends perpendicularly to the direction that snow will be removed.

In typical use, the device is positioned with the bristles pointed downward toward the surface to be cleared such that a side or side face portion of the device is generally perpendicular to the path of snow to be removed. Generally, snow is pushed ahead of the snow brush as the device is pushed or pulled across the surface to be cleared. With the bristles pointed downward, snow can be safely removed from the hood or the top of the vehicle with little danger of significantly damaging the paint.

In an alternative use, the device may be used on windshields with the plowing portion abutting the windshield. Once the heavy snow has been removed with the plowing means, the device is turned 180° about the longitudinal axis of the device so that the brushing means is in contact with the surface to be cleared. Since the mass moment of the device about its longitudinal axis is relatively small, the device can easily be controlled, particularly when flipping from the plowing means to the brushing means. The lighter remaining snow may be removed with the brushing means.

With either use, snow is generally directed laterally toward the opposite, open end of the channel, since the channel portion is closed by the snow-stopping portion at the end near the handle portion. In this manner, snow is somewhat directed away from the user's hand, thereby at least somewhat protecting the user's hand from contact with the snow.

The back-to-back relationship of the two plowing means allows the device to be used equally effectively with either the right or left hand, from either side of the vehicle, or with upward or downward strokes. To remove snow from difficult-to-reach areas, such as gutters formed between windows and body parts or gutters around windshield wipers, the plowing member edge portion can be slipped under the snow and the snow lifted out of the recess.

The preferred, tapered, upper curved portion of the plowing member can be used as a chiseling tool to remove ice, frost, or packed snow. The device may also be used for loosening windshield wipers frozen to a windshield; for example, the plowing member edge portion may be slipped under a portion of the wiper frame such that the wiper is generally parallel to the channel portion. The leverage of the elongated handle portion may then be used to lift the wiper from the windshield.

Finally, the overall flat construction of the preferred embodiment makes for easy storage under a car seat or the like, and easy handling.

BRIEF DESCRIPTION OF THE DRAWINGS

In the drawings, wherein like reference numerals indicate corresponding parts throughout the several views.

FIG. 3 is an enlarged side elevational view of the device depicted in FIGS. 1 and 2.

FIG. 4 is an end view of the device taken generally from the orientation of line 4—4, FIG. 3.

DETAILED DESCRIPTION

Figure 2:
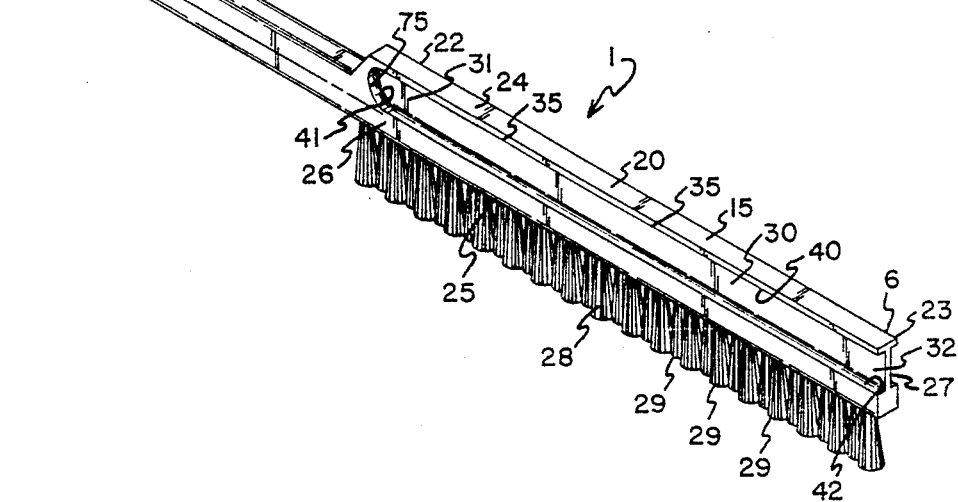
FIG. 2 is an enlarged perspective view of the device depicted in FIG. 1.

As seen in FIG. 2, a snow removal device 1 according to a preferred embodiment of this invention includes a first end 5 and a second opposite end 6. The device comprises an elongate handle portion 10 generally near the first end 5, and a snow removal portion 15 generally near the second end 6.

The snow removal portion 15 includes a snow removal body member 20 having a first end 22 and a second opposite end 23. The preferred snow removal body member 20 includes a first, top face portion 24 and a second, bottom face portion 25. The body member 20 further includes a first side face portion 26 and a second side face portion 27, best shown in FIG. 4.

As shown in FIG. 2, the snow removal portion body member 20 includes a brushing or sweeping means 28 which extends from the body member bottom face portion 25. The preferred brushing means 28 includes a plurality of bristles 29 attached to the body member bottom face portion 25 in any suitable manner. The brushing means 28 is generally parallel to the body member 20.

The preferred body member 20 further includes a plowing means 30. The preferred plowing means 30 has a first end portion 31 and an opposite second end portion 32. The plowing means 30 further includes a concave plowing member 35. Plowing member 35 defines a longitudinal recessed channel portion 40 having a first end 41 and a second opposite end 42. The channel portion 40 extends generally parallel to the body member 20.

As shown in FIG. 4 the preferred concave plowing member 35 includes an edge portion 45 adjacent to and generally parallel to the body member top surface face portion 24. An upper curved portion 48 abuts edge portion 45. A vertical back wall portion 52 abuts the upper curved portion 48. A lower curved portion 56 is adjacent to the vertical back wall portion 52. The vertical back wall portion 52 and the lower curved portion 56 intersect.

An alternative plowing member would include an edge portion adjacent to and generally parallel to the body member top surface face portion. An upper cured portion would abut the edge portion. A vertical back wall portion would abut the upper curve portion. A lower slope wall would be adjacent to the vertical back wall portion. The vertical back wall portion in the lower slope wall would intersect and define an angle therebetween. The angle would preferably be greater than 90°, and be most preferably between 110° and 160°.

The preferred plowing means 30, as shown in FIG. 2, includes a guarding or snow-stopping portion 75 which effectively closes off the first end portion 31 of the channel portion. In use, the guarding portion 75 inhibits snow from being channeled outward from the plowing means first end, and toward the user's hand.

As shown in FIG. 4, the preferred plowing means 30 includes a second plowing member 80 substantially similar to the first plowing member 35 and oriented in an opposite or a back-to-back parallel relationship with the same.

The preferred handle portion 10 shown in FIG. 2 is elongate and substantially flat. It extends from the first end portion 22 of the snow removal body member 20. In the preferred embodiment shown, the handle portion 10 and the body member 20 are integral.

Figure 1:
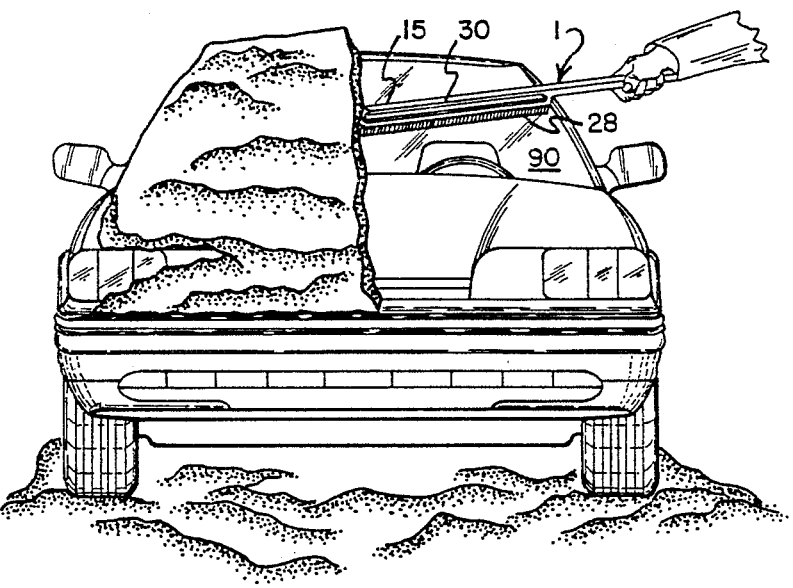
FIG. 1 is a perspective view of a device according to the present invention depicted in use to clear an automobile windshield of snow.

In typical use, as illustrated in FIG. 1, the device 1 is positioned with the bristles 29 abutting the surface 90 to be cleared. The plowing means 30 will remove the upper layer of a relatively deep snow cover while the brushing means 28 removes the lower layer of snow.

Since the preferred snow removal portion 15 includes a second plowing member 80 parallel to the first plowing member 35, it is to be understood that the device 1 can be used with upward or downward strokes with either the right or the left hand of either side of the vehicle.

In an alternative use, the device 1 can be used with the plowing portion 30 abutting a windshield to be cleared. Once heavy or deep snow has been removed from the surface 90 to be cleared, the device 1 may be rotated 180° on its longitudinal axis 105, so that the brushing means bristles 29 contact the surface 90 to be cleared. Light, remaining snow, may then be removed by brushing.

The device 1 can also be used for removing snow from difficult-to-reach areas, such as gutters formed between windows and body parts. Edge portion 45 can be inserted into these hard-to-reach areas and snow lifted therefrom.

Further, edge portion 45 can be used to remove ice from a surface 90 by dislodging the ice with edge portion 45.

Windshield wipers frozen to a windshield may be loosened with the device 1 by placing edge portion 45 under a wiper or wiper frame and using leverage provided by the elongate handle portion 10 to lift the wiper.

It will be understood that the present invention may be embodied in a variety of forms. The above descriptions, therefore, are not to be interpreted as limiting, but rather as a basis for the claims and as a basis for teaching persons skilled in the art the invention, which is defined by the following claims.

What is claimed is:

1. A snow removal device comprising:
    (a) an elongate snow removal body member having first and second opposite ends, and plowing means;
        (i) said plowing means including a longitudinal recessed channel portion having first and second ends and extending generally parallel to a longitudinal extension of said body member;
        (ii) said snow removal body member further including first and second face portions generally parallel and spaced apart, said first face portion defining a generally concave plowing member of said plowing means;
        (iii) said plowing means further including a snow-stopping portion proximate said first end of said snow removal body member, said snow-stopping portion closing said first end of said channel portion; and,
        (iv) said plowing member including: an edge portion; a first curved portion adjacent said edge portion; a back wall portion adjacent said curved portion; and, a second curved portion adjacent said back wall portion; and,
    (b) an elongate handle portion oriented proximate said first end of said snow removal body member and extending generally coplanar with said elongate snow removal body member.

2. A snow removal device according to claim 1, wherein said snow removal body member includes a third face portion generally perpendicular to and contiguous with said first and second face portions.

3. A snow removal device according to claim 2, wherein said snow removal portion includes a brushing means extending from said third face portion.

4. A snow removal device according to claim 3, wherein said brushing means is longitudinally parallel to said handle portion and to said plowing means.

5. A snow removal device according to claim 1, wherein said handle portion is integral with said body member.

6. A snow removal device according to claim 1, wherein said plowing means is integral with said body member.

7. A snow removal device comprising:
    (a) an elongate snow removal body member having first and second opposite ends, and plowing means;
        (i) said plowing means including a longitudinal recessed channel portion having first and second ends and extending generally parallel to a longitudinal extension of said body member;
        (ii) said snow removal body member further including first and second face portions generally parallel and spaced apart, said first face portion defining a generally concave plowing member of said plowing means;
        (iii) said plowing member including: an edge portion; a curved portion adjacent said edge portion; a back wall portion adjacent said curved portion; and, a sloped wall portion adjacent said back wall portion; and,
    (b) an elongate handle portion oriented proximate said first end of said snow removal body member and extending generally coplanar with said elongate snow removal body member.

8. A snow removal device according to claim 7, wherein said back wall portion and said sloped wall portion intersect and define an angle of at least about 90° therebetween.

9. A snow removal device according to claim 7, wherein said back wall portion and said sloped wall portion intersect and define an angle of more than about 110° but less than about 160° there between.

10. A snow removal device comprising:
    (a) an elongate snow removal body member having first and second opposite ends, and plowing means;
        (i) said plowing means including a longitudinal recessed channel portion having first and second ends and extending generally parallel to a longitudinal extension of said body member; p2 (ii) said snow removal body member further including first and second face portions generally parallel and spaced apart, said first face portion defining a generally concave plowing member of said plowing means;

(iii) said snow removal body member including a third face portion generally perpendicular to and contiguous with said first and second face portions;
(b) brushing means extending from said snow removal body member third face portion; and,
(c) an elongate handle portion oriented proximate said first end of said snow removal body member and extending generally coplanar with said elongate snow removal body member.

11. A snow removal device comprising:
(a) an elongate snow removal body member having first and second opposite ends, and first plowing means;
  (i) said first plowing means including a longitudinal recessed channel portion having first and second ends and extending generally parallel to a longitudinal extension of said body member;
  (ii) said snow removal body member including a second plowing means in back-to-back parallel relationship with said first plowing means; said second plowing means including a longitudinal recessed channel portion having first and second ends and extending generally parallel to a longitudinal extension of said body member; and,
(b) an elongate handle portion oriented proximate said first end of said snow removal body member and extending generally coplanar with said elongate snow removal body member.

12. A snow removal device according to claim 11, wherein said first plowing means back wall portion and said second plowing means back wall portion are substantially parallel.

13. A snow removal device according to claim 11 wherein:
(a) said snow removal body member includes first and second face portions generally parallel and spaced apart;
  (i) said first face portion defining a generally concave plowing member of said first plowing means; and,
  (ii) said second face portion defining a generally concave plowing member of said second plowing means.

14. A snow removal device according to claim 13, wherein said snow removal body member includes a third face portion generally perpendicular to and contiguous with said first and second face portions.

15. A snow removal device according to claim 14, wherein said snow removal portion includes a brushing means extending from said third face portion.

16. A snow removal device according to claim 11 wherein:
(a) said first plowing means includes a snow-stopping portion proximate said first end of said snow removal body member, said first plowing means snow-stopping portion closing said first end of said first plowing means channel portion; and,
(b) said second plowing means includes a snow-stopping portion proximate said first end of said snow removal body member, said second plowing means snow-stopping portion closing said first end of said second plowing means channel portion.

17. A snow removal device according to claim 11 wherein:
(a) said first plowing means includes: a first edge portion; a first curved portion adjacent said first edge portion; a first back wall portion adjacent said first curved portion; and, a second curved portion adjacent said first back wall portion; and,
(b) said second plowing means includes: a first edge portion; a first curved portion adjacent said second plowing means first edge portion; a second plowing means back all portion adjacent said second plowing means first curved portion; and, a second curved portion adjacent said second plowing means first back wall portion.

18. A snow removal device according to claim 17 wherein:
(a) said first plowing means includes: an edge portion; a curved portion adjacent said edge portion; a back wall portion adjacent said curved portion; and, a sloped wall portion adjacent said back wall portion; and,
(b) said second plowing means includes: a second plowing means edge portion; a curved portion adjacent said second plowing means edge portion; a second plowing means back wall portion adjacent said second plowing means curved portion; and, a sloped wall portion adjacent said second plowing means back wall portion.

19. A snow removal device according to claim 11 wherein:
(a) said first plowing means back wall portion and said first plowing means sloped wall portion intersect and define an angle of at least about 90° therebetween; and,
(b) said second plowing means back wall portion and said second plowing means sloped wall portion intersect and define an angle of at least about 90° therebetween.

* * * * *